United States Patent
Sevigny (10) Patent No.: US 9,140,852 B2
(45) Date of Patent: Sep. 22, 2015

(54) HIGH-DENSITY FIBER COUPLING AND EMISSION/DETECTION SYSTEM

(71) Applicant: APPLIED MICRO CIRCUITS CORPORATION, Sunnyvale, CA (US)

(72) Inventor: Benoit Sevigny, Mountain View, CA (US)

(73) Assignee: VOLEX PLC, London (GB)

(*) Notice: Subject to any disclaimer, the term of this patent is extended or adjusted under 35 U.S.C. 154(b) by 204 days.

(21) Appl. No.: 13/645,629

(22) Filed: Oct. 5, 2012

(65) Prior Publication Data

US 2014/0099124 A1     Apr. 10, 2014

(51) Int. Cl.
*H04J 14/02* (2006.01)
*G02B 6/06* (2006.01)
*G02B 6/42* (2006.01)
*G02B 6/293* (2006.01)

(52) U.S. Cl.
CPC ............... *G02B 6/06* (2013.01); *G02B 6/4249* (2013.01); *G02B 6/2938* (2013.01)

(58) Field of Classification Search
CPC ..... G02B 6/2931; G02B 6/2938; H04B 10/25; H04B 10/2503
USPC ..................... 398/88, 138, 139, 142
See application file for complete search history.

(56) References Cited

U.S. PATENT DOCUMENTS

| | | | | |
|---|---|---|---|---|
| 8,567,961 | B2* | 10/2013 | Huebner | 353/94 |
| 2004/0208439 | A1* | 10/2004 | Bell et al. | 385/32 |
| 2004/0218854 | A1* | 11/2004 | Lemoff | 385/24 |
| 2006/0124835 | A1* | 6/2006 | Kiyomoto et al. | 250/216 |
| 2011/0103409 | A1* | 5/2011 | Sipes, Jr. | 372/6 |

\* cited by examiner

*Primary Examiner* — Dzung Tran
(74) *Attorney, Agent, or Firm* — Baker & Hostetler LLP (57) ABSTRACT

An optical system including an array of photonic devices that convert light signals to electrical signals or electrical signals to light signals are coupled together and optically coupled to an array of optic fibers of an information channel. A lens couples optical beams generated to at least one array of photonic devices and the array of optic fibers for an optical communication there-between. The array of photonic devices and the array of optic fibers are respectively arranged in a honeycomb configuration.

20 Claims, 10 Drawing Sheets

HIGH-DENSITY FIBER COUPLING AND EMISSION/DETECTION SYSTEM

TECHNICAL FIELD

The subject application relates to optical systems having high-density fiber coupling in an information channel, and, in particular, a coupling with high-density fibers and an emitter/receiver array.

BACKGROUND

Advances in technology have made communication using electromagnetic waves are the most reliable and fastest ways of communicating information between points. In general, electromagnetic communication systems generate information at a source (e.g., transmitter). Information is transmit as a signal through a channel, such as free space in radio applications, electronic lines in telephone and internet applications, or optic fibers in fiber optic applications. During transmission, a channel propagating information usually induces loss in a signal and/or distorts the signal. Likewise, various other mechanics may introduce noise in a signal. A signal is typically received by a receiver which can utilize and/or decode the signal.

An optic engine or transmitter utilizes a laser diode (LD) or light-emitting diode (LED) to encode data through modulation, such as amplitude modulation (AM), frequency modulation (FM), and digital modulation. LD and LED sources commonly generate signals with wavelengths in a range from 660 nanometers (nm) to 1,550 nm. Encoded data is propagated through an optic fiber (e.g., silicon). Optic fibers, couple to an optical receiver which detects, amplifies, and decodes (demodulates) the encoded data.

The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

Various embodiments are disclosed for an optical system. An exemplary system comprises an information channel component configured for carrying an optical beam along a guided pathway and comprising a plurality of fiber optic channels bundled together. The system includes an optical transmitter component comprising a plurality of optical emitters coupled together in a first array and jointly coupled to the information channel component. A first lens component is configured for coupling the optical beam from the plurality of optical emitters to the plurality of fiber optic channels for transmission of the optical beam.

In another non-limiting embodiment, a system is disclosed having an array of photonic devices coupled together and that is configured for integrating at least one optical beam with an electronic circuit. An information channel component is configured for guiding the optical beam along a guided pathway having a receive channel and a transmit channel, and comprises a plurality of optic fibers bundled together. A lens component configured to couple the array of photonic devices to the information channel.

In yet another non-limiting embodiment, an exemplary method for optically communicating a light beam, comprises generating a plurality of optical beams with a first array of photonic devices coupled together. The plurality of optical beams is coupled from the array of photonic devices with a lens to a plurality of optical fibers bundled together in an information channel. The plurality of optical beams is communicated through the information channel.

As used herein the term hexagonal compact includes a two dimensional stack of units (e.g., fibers and/or optoelectronic/photonic components) where each individual is equally distant from all of its closest neighbors, which are at approximately a sixty degree angle relative to one another, such as in a honeycomb configuration. A fiber array, an array of optical fibers or like terms is meant as a structure of agglomerated fibers in a hexagonal compact shape used to couple light in or out of a cable or information channel. An emitter/receiver array can be a photonic array structure of emitters (e.g., Vertical-Cavity Surface-Emitting Lasers (VCSELs)) and/or receiver (e.g., photodiodes or PDs) used to convert electrical signals into light and vice versa. An optical system as used herein is meant as any optical scheme (diotropic, diffractive optics, etc.) used to couple light from the emitter array to the fiber array and/or from the fiber array to the receiver array. Fusion is the action by which optical fibers are fused together. Cleave is a term of action by which one or more fibers are precisely cut along a plane by applying tension and initiating a crack that propagates perpendicular to the plane of normal stress, in either order, in which alternatively the crack can be made and the tension applied afterwards through various means. Fiber polishing describes an action of preparing fiber ends b polishing, usually along a plane perpendicular to the fiber axis, which can be applicable also to structures composed of several fibers.

The following description and the annexed drawings set forth in detail certain illustrative aspects of the disclosed subject matter. These aspects are indicative, however, of but a few of the various ways in which the principles of the various embodiments may be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Embodiments and examples are described below with reference to the drawings, wherein like reference numerals are used to refer to like elements throughout. In the following description, for purposes of explanation, numerous specific details in the form of examples are set forth in order to provide a thorough understanding of the various embodiments. It will be evident, however, that these specific details are not necessary to the practice of such embodiments. In other instances, well-known structures and devices are shown in block diagram form in order to facilitate description of the various embodiments.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon such as with a module, for example. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Overview

In consideration of the above-described deficiencies among other things, various embodiments are provided for optical systems and optical components to process optical signals or messages in an array of photonic devices (optoelectronic devices) in an array of optical fibers couple to the array of photonic devices. In example method to achieve optical coupling and de-coupling is through individually coupling linear fiber and optoelectronics arrays where each fiber is coupled through an individual lens to its corresponding component in the receiver array (and vice-versa for the emitter coupled to the fiber). In addition, another method involves individual fibers being coupled to individual optoelectronic devices through an individual lens. In both these examples, the optical system can be geometrically very constrained and also dependent on fiber ribbon alignments, which can be less accurate in their spacing. Although this does not apply to an individual fiber to individual optoelectronics device scheme, those schemes have another problem which is that it is hard to make them dense as they typically use larger lenses (for collimation, for example, in the context of a connector).

In one example, a method can utilize a lens component with a single lens to couple an emitter array to a fiber array, and/or a fiber array to a detector array. Because the arrays themselves can demand very good component-to-component positioning for alignment, the alignment of the components is reduced to aligning one array to the other, in which various means exists to easily constrain this alignment for the fiber array because of the resulting geometry of the structure. For instance, the natural 60-degree angle of the structure and its relatively bigger size than that of a single fiber can be considered when making a more easily manufactured v-groove for example. Furthermore, for both the photonics (optoelectronics) and the fiber, the fact that their relative positions are very repeatable removes a number of tolerances from the equation and likely yield more accurate and repeatable individual components or elements placement.

High-Density Fiber Coupling and Emission/Detection System

Figure 1:
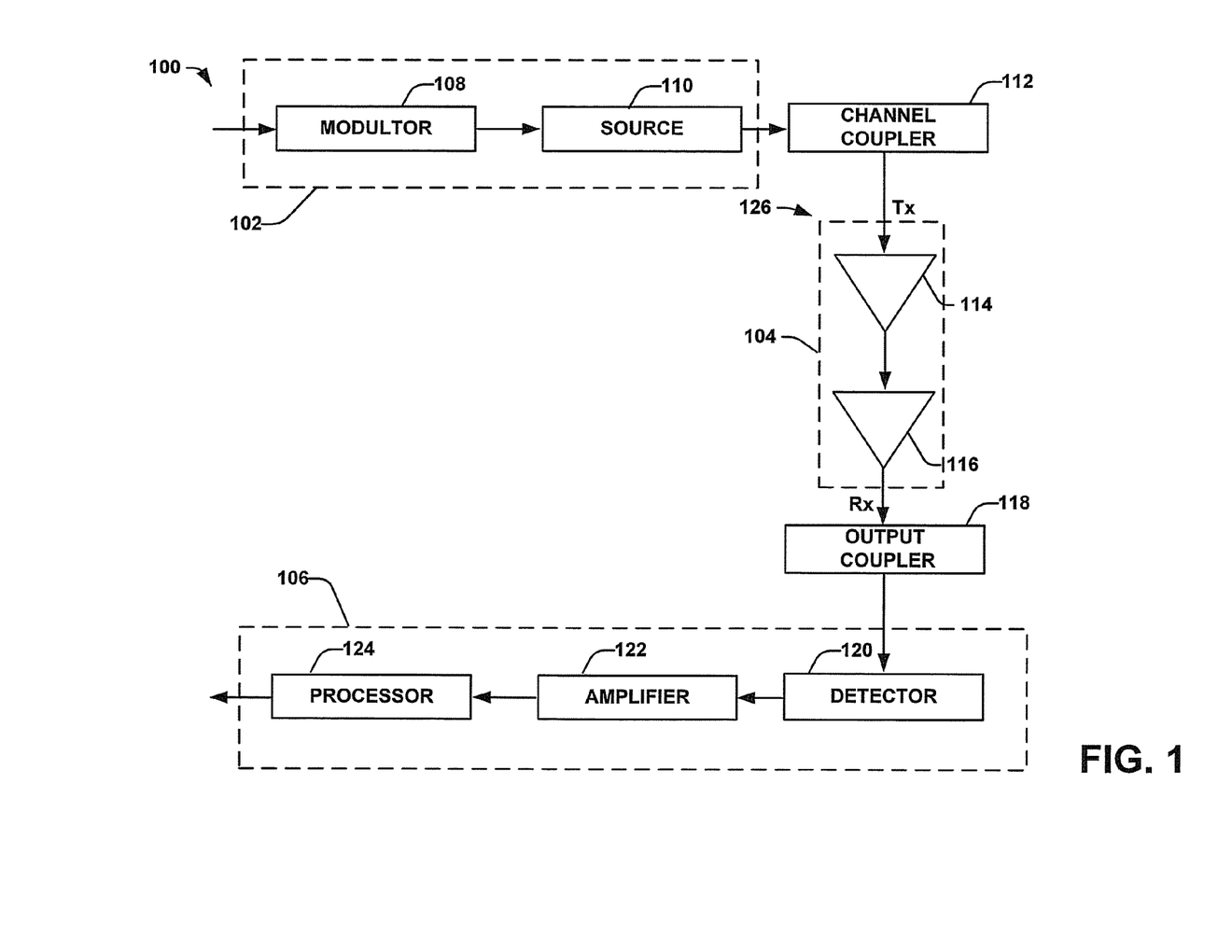
FIG. 1 illustrates an example optical system in accordance with various aspects described herein.

Referring initially to FIG. 1, illustrated is an optical system 100 for communication with an optical beam in accordance with various embodiments in this disclosure. System 100 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and as well as other figures disclosed herein. System 100 is one example architecture of an optical system in which the components of the system can be combined and/or operate externally to one another in different architectures. For example, the system 100 includes a transmitter component 102, an information channel component 104 and a receiver component 106, in which any number of the components can be separate and/or in combination as one component, such as an optical transceiver component that includes at least the transmitter component 102 and the receiver component 106.

The transmitter component 102 of the system 100 comprises at least one optical emitter such as VCSEL device, a Laser Emitting Diode (LED), a Laser Diode (LD) and/or other semiconductor optical device (e.g., Organic Light Emitting Diode, etc.) for communicating an optical signal. The transmitter component 102, for example, includes a modulator component 108 and an optical or carrier source component 110 that communicates to the information channel 104 via a channel coupler component 112. The transmitter component 102 operates as an optical emitter that converts messages inputted into one format (e.g., an electronic format) into a different format (e.g., an optical format). The modulator component 108 converts a message into a proper format (e.g., analog, digital) for transmission in the system 100 (e.g., analog, digital), and is further configured to impress the message onto a wave (e.g., an optical wave). The source component 110 generates the carrier wave on which the information from the modulator component is transmitted (e.g., in an optical wave format), which can be generated from any optical oscillator. The channel coupler 112 operates to feed power into the information guide 104, such as an optical cable. The channel coupler 112 operates to direct an optical beam toward the information guide 104 by directing, focusing and/or magnifying the optical beam onto an end surface 126 of an information guide 104, for example. The transmitter component 102 interfaces with the information guide component 104, which includes a guided information pathway, such as an optical fiber (fiber optic) or other functioning guide for the optical transmission of data over a defined distance.

The information guide 104 includes a transmit channel (Tx), a receive channel (Rx), one or more optical amplifiers and/or repeaters 114 and/or 116, and is configured to communicatively couple the transmitter component 102 with the receiver component 106. The optical amplifiers of the information guide 104 operate to boost power levels and ensure sufficient power to the receiver component 106. Optical repeaters (regenerators) can also convert weak and distorted optical signals to electrical ones and then regenerate the original digital pulse trains for further transmission, in which any of the components 114 and/or 116 can operate as an optical amplifier and/or an optical repeater based on design of the information guide 104, and the system architecture. Along the receive channel Rx, the information guide 104 directs the transmitted optical beam to the receiver component 106 via an output coupler 118, which operates to direct, focus and/or magnify the optical beam to the detector 120.

The receiver component 106 can comprise an optical receiver device such as a photodetector (e.g., p-n photodiode, p-i-n photodiode, avalanche photodiode, and/or the like). The receiver component, for example, can include a detector 120, an amplifier 122 and a processing unit (e.g., a processor). The detector 120 can operate to convert the optical beam into an electronic current or other energy format. The detector 120, for example, can include a photo detector that demodulates the optical signal received through the receive channel Rx and the information guide 104. The amplifier 122 can operate to amplify or remove any bias of the data in electrical form for processing at the processing unit 124, which can further amplify and/or filter the current for quality communications.

In one embodiment, the receive channel Rx and the transmit channel Tx are of equal lengths and/or of equal distances with respect to one another. An advantage of having substantially similar lengths in the Rx channel and the Tx channel is that a reference is provided for balancing tolerances in both channels; however as a result, tolerances in signal transmission can become an increasingly limiting factor in the information guide 104 such as with fiber optics supporting multiple modes. For example, the information guide 104 can include a plurality of modes, in which can present a difficulty involving the difference between the transverse radiation pattern of the source 110 and the mode patterns of waveguide modes in the information channel 104. Exact coupling with the waveguide can be difficult unless the optic beam patterns are substantially identical, or, in other words, substantially matched. For example, rays associated with different modes have each mode excited by a plane wave incident on a slab therein such that the internal angle of the beam is a desired value to guide the beam. As such, coupling the optical beam from the source 110 to the information guide component 104 and also to the detector 120 is provided with symmetrical channels in length or in distance with respect to space.

In another embodiment, the transceiver component 102, the receiver component 106, and/or the information channel 104 are configured in a honeycomb configuration that includes an array of optical emitters, an array of receiver devices and/or an array of optical fibers respectively. The channel coupler 112 can comprise a single lens (e.g., a convergent lens, convex lens, aspheric lens or other lens shape) that focuses one or more optical beams onto an end surface of the information channel 104. Additionally, the output coupler 118 can comprise a single lens (e.g., convergent lens, etc.) that also focuses one or more optical beams (optical patterns) onto the array of optical receiver devices, which can comprise a different or same number of receiver devices as the array of optical emitters.

An advantage of having the array of optical emitters coupled via a single lens of the channel coupler 112 to an array of optical fibers is that the configuration enables increased density of channels in an optical device and eliminates several placement tolerances as the fiber-to-fiber and optical emitter-to-optical emitter patterns, which are more accurate in alignment. Likewise, the same advantages are provided in addition or alternatively, with the array of optical fibers in the information channel being coupled to the array of receiver devices via the output coupler 118, which can include a single lens for transmission of one or more optical beam patterns.

Figure 2:
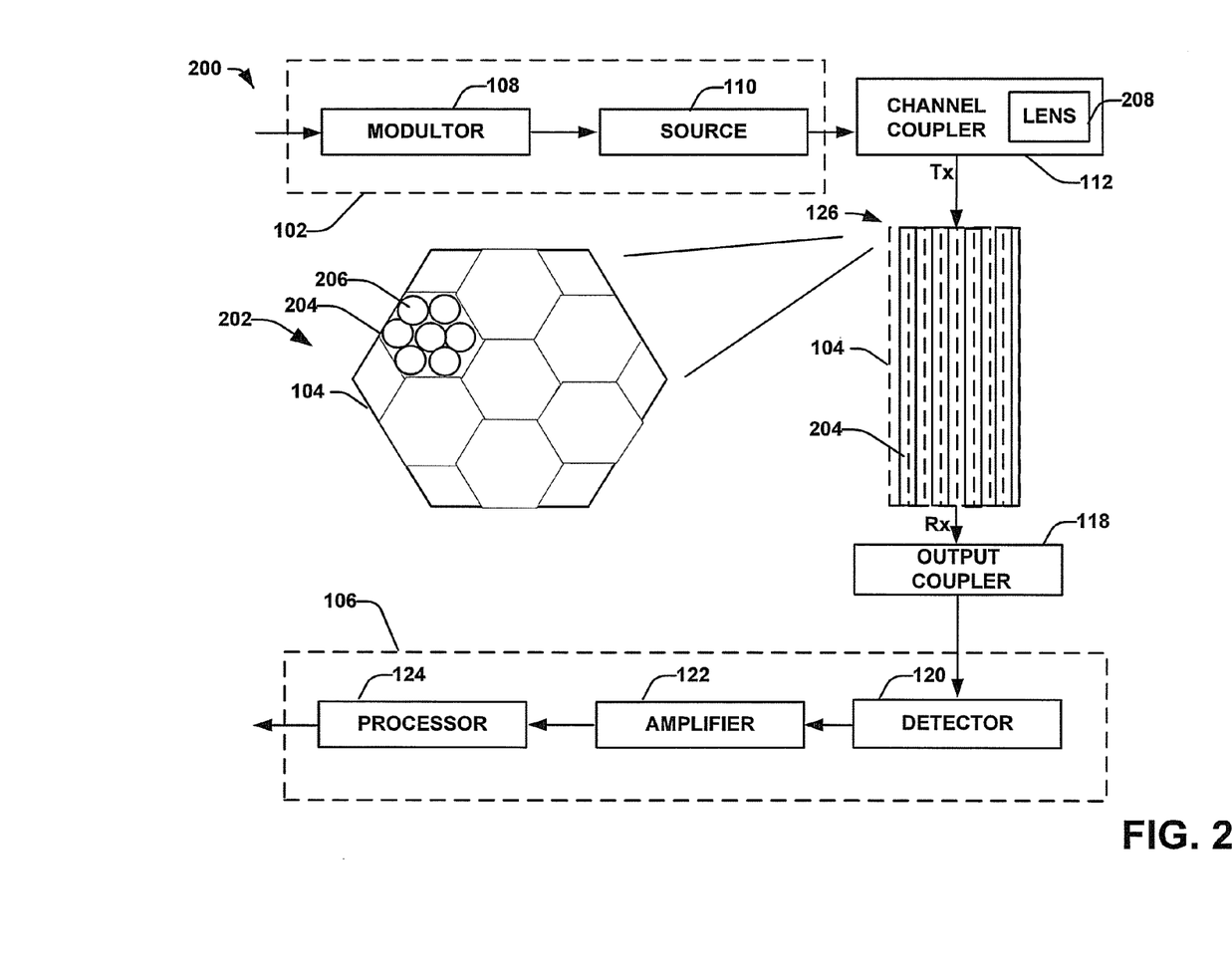
FIG. 2 illustrates another example optical system in accordance with various aspects described herein.

Referring to FIG. 2, illustrates an example of an optical system 200 in accordance with various embodiments. The system 200 includes similar components as discussed above, and comprises an array of optical fibers or fiber optics 204 that includes individual optical fibers 206 bundled together in the information channel 104. The array of optical fibers 204 are illustrated in an enlarged cross-section 202 along with other arrays of the information channels that also include fiber optics 206, which are not individually shown for each array of the cross-section 202 for ease of explanation.

In one example configuration, the array of optical fibers 204 can include any number of optical fibers coupled together by being bundled, fused, and/or cleaved for optical transmission. Different configurations are envisioned and can include, for example, a hexagonal compact (honeycomb) configuration, as well as other configurations (e.g., octagonal, etc.). The array of optical fibers 204 can include 3, 6 (with a sacrificial fiber), 7, or any other number of fiber optics bundled together, and joined (e.g., agglomerated, fused, etc.) in a parallel configuration for transmission of one or more optical beams in an optical communication. For example, fiber optics 206 can be bundled together in an array 204 pattern that couples one fiber optic to another in parallel and polished at the end face 126.

The fiber optics 206 can be coupled together in the array of fiber optic channels (optical fibers) 204 by fusing the fiber optic channels together or by agglomerating them and gluing them together by a mechanical means. The fiber optic array 204 structure is then cleaved (if fused), or cut and polished (if glued). The resulting plurality of optical fibers is what is referred to as the fiber array, the array of fiber optic channels, fiber optics or otherwise referred to by similar terms herein. By observing the transmit channel Tx (i.e., the TX side) of the optical system 200, the fiber array 204 can be positioned in the image space, in a groove (or other mechanical registration device) that accurately sets the fiber array in place both along, across and angularly with respect to the system (optical beam) axis. A multi-emitter chip (not shown) can then be positioned in the object space and similarly aligned by appropriate methods (i.e., features on the board, mechanical alignment and so on). For example, an array of photonic devices (emitters and/or receivers) can be optically coupled to the information channel 204 on a semiconductor die that integrates the optical transmitter component 102 with the information channel and the lens component 208 on a substrate. The magnification ratio can be given by the properties of the emitters and fibers combined. The dimensional properties of the fiber and emitter arrays should be in the same magnification ratio (i.e. component-to-component distance). Although the magnification in the RX space could be different, the same manufacturing methods could be used for manufacturing on the RX channel, swapping "image" and "object" in the previous description and replacing "emitter" with "receiver. For example, the receiver component 106 can include an array of photodetectors coupled together in an array and aligned accordingly with the array of fiber optics of the information channel 104 on the receive channel Rx side, which is further detailed below.

In another embodiment, the information channel 104 can include the array 204 of fiber optics 206. Additionally, the information channel can include any number of arrays 204 optical fibers that are coupled to one another or individually integrated within the information channel 104. Although FIG. 2, illustrates a honeycomb configuration of about seven different arrays 204 of optical fibers 206, any number or configuration is envisioned. An individual array 204 of fiber optics that are bundled and/or joined together can be coupled to the transceiver component 102 respectively via the channel coupler 112 of the transmit channel Tx and to the receiver component 106 via the output coupler 118 of the receive channel Rx.

In another example, the channel coupler 112 includes a lens component 208 that includes a single lens that focuses the optical beam of the transmitter component 102 to an array of optic fibers (channels) 204. The transmitter component 102 can include an array of transmitter devices or, in other words, an array of emitter devices (not shown) that are coupled together, as further described below. The lens component 208 can include a single lens that focuses the optical beam from the transmitter component 102 for communication via the array of optical fibers 204 and to the receiver component 118.

Figure 3:
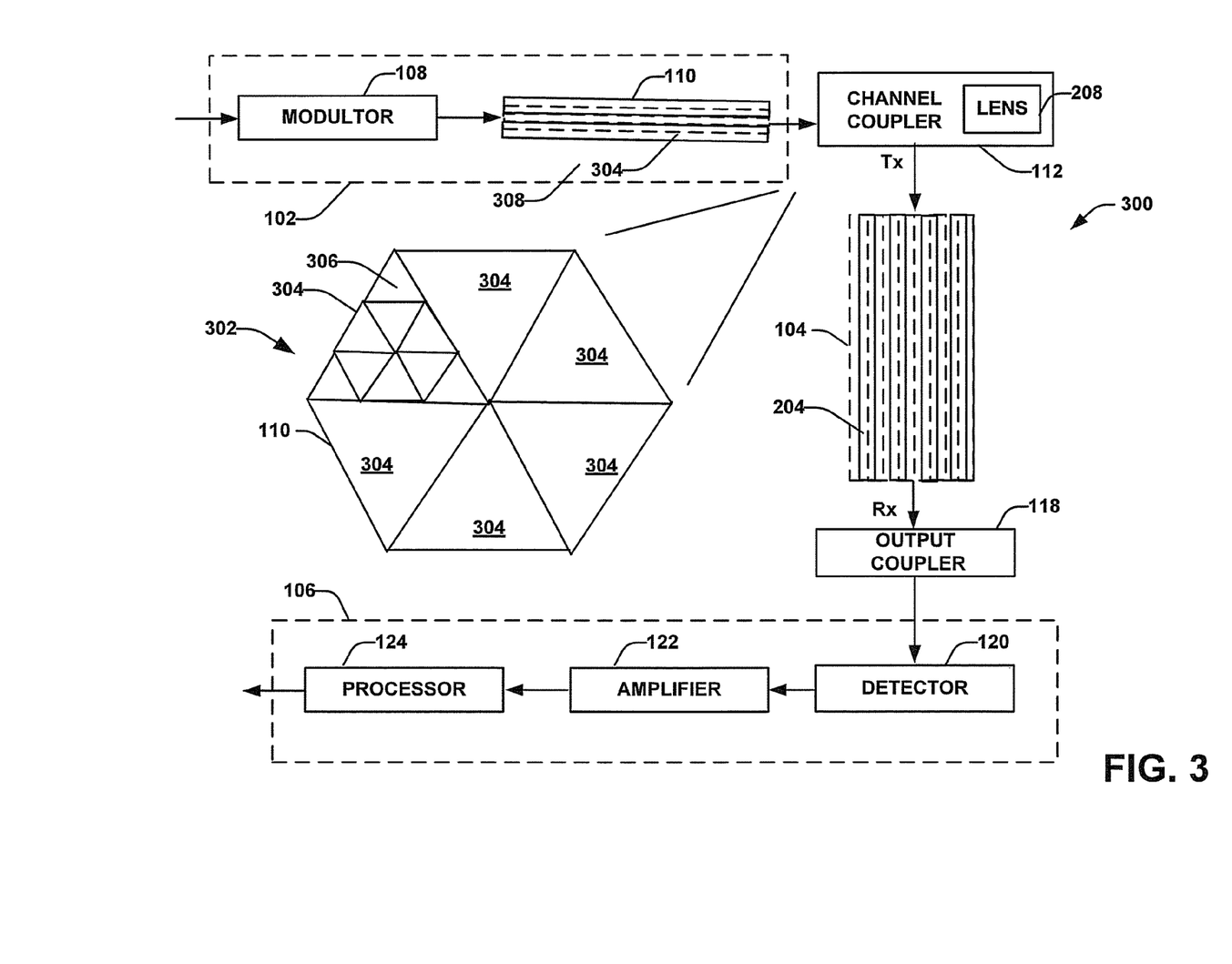
FIG. 3 illustrates another example optical system in accordance with various aspects described herein.

Referring now to FIG. 3, illustrates an optical system comprising the transmitter component 102 that includes an array of emitter devices 302 for transmitting one or more optical beams to the information channel 102. An enlarged cross-section 302 of the transmitter component 102 illustrates multiple arrays 304 joined together in array configuration, in which any number of arrays 304 of optical emitters can be implemented within the transmitter component 102 and any number of a plurality of optical emitters can be included within an array. Each array 304 of optical emitters 306 include a plurality of compact bundled emitter devices 306 that can be arranged in various configurations, such as a honeycomb or hexagonal compact configuration, in which the array(s) of optical emitters 304 are communicatively couple to one or more arrays of optical fibers 204 of the information channel 104. For instance, the array of optical emitters 304 can be configured in a natural 60 degree angle to one another and oriented to direct optical beam patterns via a lens component 208 having a single lens to a fiber optic array 204. Because the positions are repeatable, for both the optoelectronics (e.g., the emitters devices in array) and the optical fibers, this removes a number of tolerances in alignments and placements for optical communication, and further the number of emitter devices 306 can be different in number from or substantially the same as the number of optical fiber arrays 204 of the information channel 104.

In one embodiment, the array of optical emitters 306 can include VCSELs or other emitter devices, which can be communicatively coupled together electronically (e.g., wired, wirelessly). For example, the array of optical emitters 306 can be optically coupled to the information channel 204 on a semiconductor die substrate 308 that integrates the optical transmitter component 102 with the information channel and the lens component 208.

In another embodiment, the first lens component 208 is configured to generate a variable optical connection configured to variably couple at least one optical emitter of the plurality of optical emitters 304 among fiber optic channels 206 of the plurality of fiber optic channels 204. In other words, rather than an individual connection from an emitter to an optical fiber, the array of emitters 304 is coupled to the array of fiber optics so that a single emitter 304 is not solely associated with a particular fiber optics, but is variably connected to fiber optics among the array of optical fibers 204.

Figure 4:
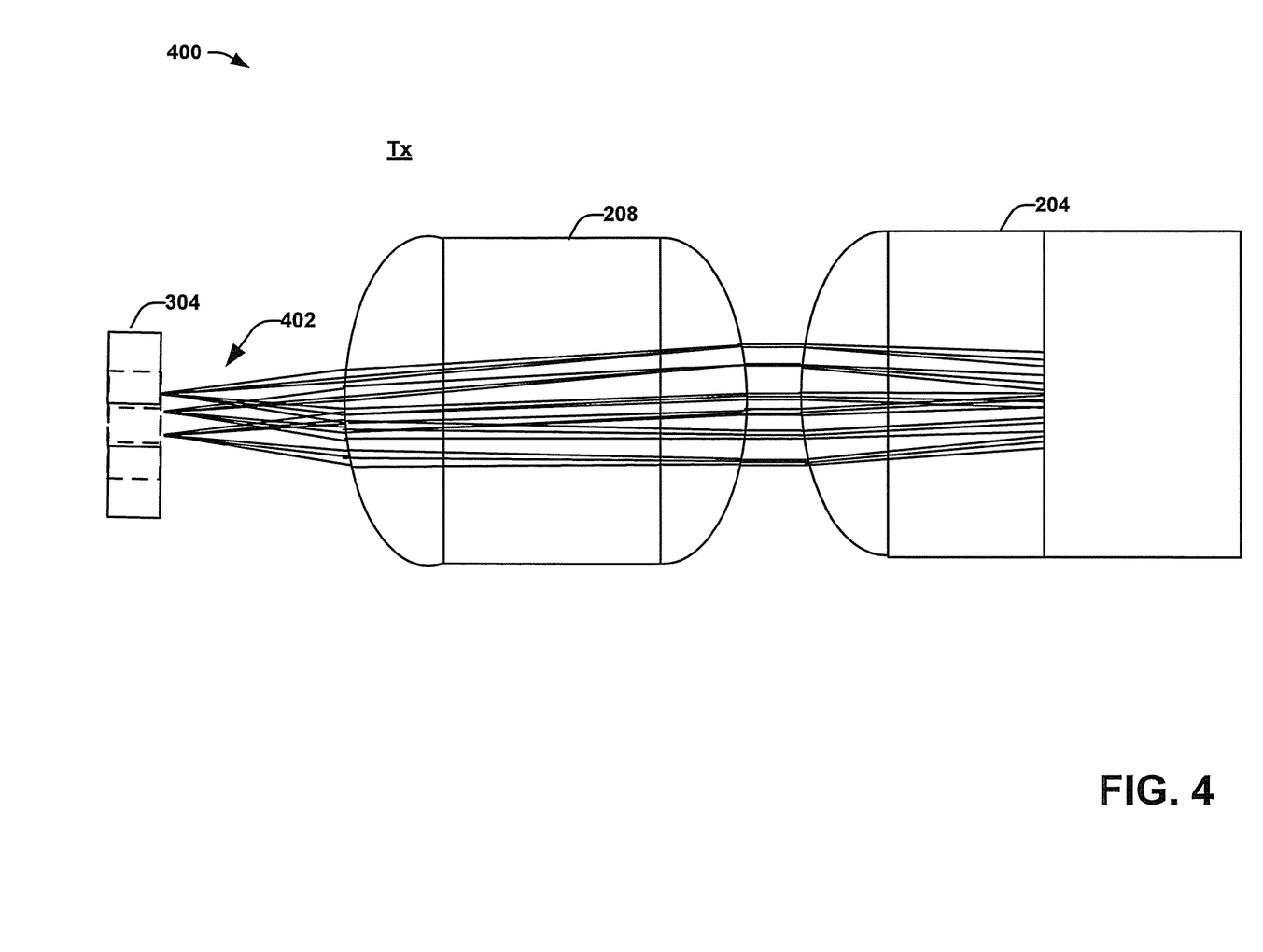
FIG. 4 illustrates an example output coupler in accordance with various aspects described herein.

Referring to FIG. 4, illustrates an optical system 400 that includes a number of optical emitters in an array of optical emitters 304 joined together. The system 400 includes a plurality of optical beams 402 (e.g., three or another number) that fan out as optical beam patterns of optical data to a lens component 208. The lens component 208 can operate as a single lens that receives the optical beams 402 generated by the array of emitter devices 208. The lens component 208 couples the beam to the array of optical fibers 204 for further transmission there-through. Because single optical fibers and emitters are replaced by arrays (e.g., honeycomb configuration arrays of fibers and emitters and/or receivers), a significant increase in the density of the channels in optical devices can be demonstrated that eliminates several placement tolerances as the fiber-to-fiber and emitter-to-emitter/receiver-to-receiver beam patterns are highly accurate.

Figure 5:
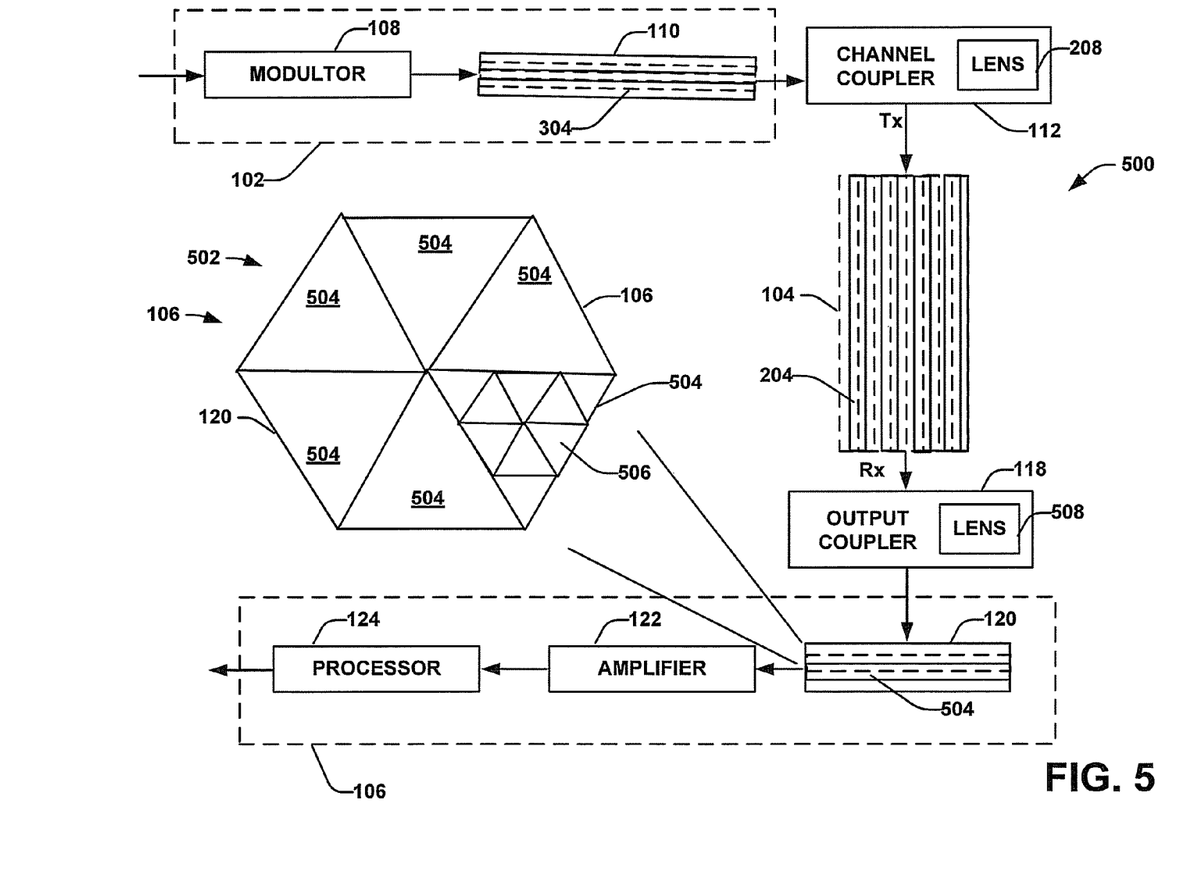
FIG. 5 illustrates another example optical system in accordance with various aspects described herein.

FIG. 5 illustrates an optical system 500 in accordance with various embodiments herein. The optical system 500 includes similar components as discussed above and further includes an enlarged cross-section of the receiver component 106 (e.g., the photodetector 120) that demonstrates at least one array of receiver devices (e.g., photodiodes, and the like) for receiving optical beams and converting the optical beams to another form of energy (e.g., an electric bias).

The photodetector 120, for example, includes one or more an arrays 504 of receiver devices 506. Similar to the array of optical emitters 304, the array 504 can include one or more array in a honeycomb configuration of receiver devices 506 or a different configuration. Multiple arrays can be further combined in a similar configuration or alternative configuration so that the photodetector 120 can include one or more arrays of receiver devices 506.

The output coupler 118 can further include a lens component 508 that operates to focus optical beams through optical fiber arrays 204 of the information channel 104 onto the one or more arrays of receiver devices. The lens component 508 can include at least one lens, similar to the lens component 208, so that the optical beams through an array of optical fibers are concentrated among receiver devices 506 among the array of receiver devices 504. Thus, fiber optic arrays can be coupled via the lens 508 to receiver arrays 504 without an individual one-to-one correspondence. For example, the lens component 508, as well as the lens component 208, is configured for generating a variable connection between an array of photonic devices (emitters and/or receivers) and the plurality of optical fibers independently of individual alignments with optical fibers of an array of optical fibers.

In one embodiment, the array(s) of receiver devices 506 can be communicatively coupled together electronically (e.g., wired, wirelessly). For example, the array of receiver devices can be optically coupled to the information channel 204 on a semiconductor die substrate as well that integrates the optical receiver component 106 with the information channel 104 and the lens component 508, in addition to or alternatively to the receiver component 102.

In one example, the lens component 208 and the lens component 508 can operate as a first and/or second lens respectively. The optical system 500 can be further arranged in a different architecture and is not limited to only the examples disclosed for explanation. For example, the systems disclosed herein can include a configuration in which only one lens component operates to couple an array of photonic devices (e.g., optical emitters and/or receiver devices) with the array(s) of fibers 204 of the information channel 104.

Figure 6:
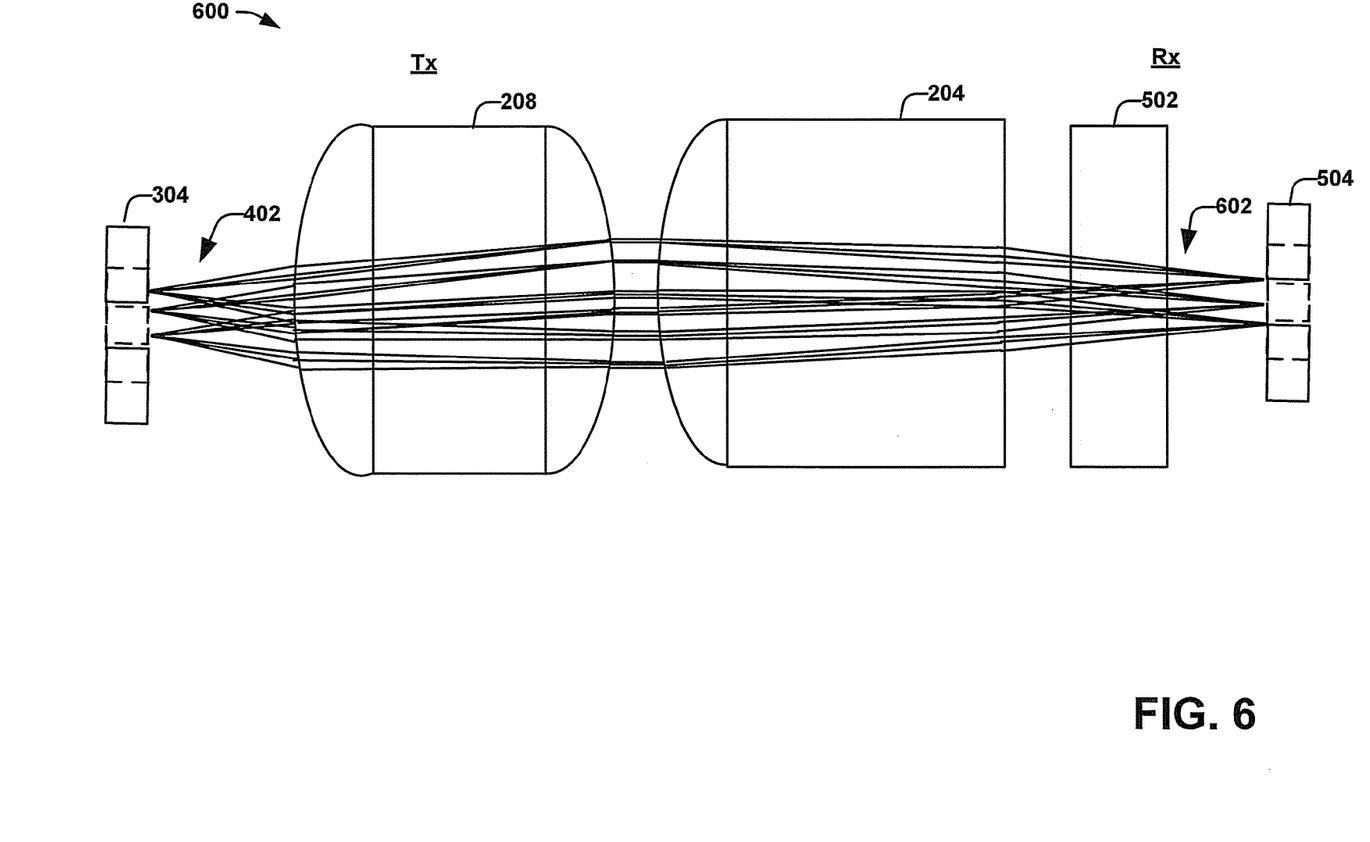
FIG. 6 illustrates another example optical system in accordance with various aspects described herein.

FIG. 6 illustrates a side view section 600 of the optical beam patterns 402 and 602, in which an array of optical emitters 304. The system 600 includes a plurality of optical beams 402 (e.g., three) that fan out as optical beam patterns of optical data to a first lens component 208. The first lens component 208 can operate as a single lens that receives the optical beams 402 generated by the array of emitter devices 208 and couples them to an array of fiber optics 204. The lens component 208 couples the beam to the array of optical fibers 204 for further transmission there-through such as with a variable connection. The first lens component 208 and a second lens component 502 are respectively configured for variably connecting at least one photonic device of the plurality of photonic devices among optical fibers of the plurality of optical fibers based on an arrangement of the plurality of photonic devise to the plurality of optical fibers in an array 204. The second lens component 602 thus operates to focus the optical beam patterns 602 to the array of photonic devices (e.g., receiver devices) independently of any single one-one-connection between the emitters and receivers. The advantage of replacing the single optical fibers and emitter/receiver devices with arrays (e.g., honeycomb configuration arrays of fibers and emitters and/or receiver devices) is that a significant increase in the density of the channels is provided in optical devices, which can eliminate several placement tolerances as the fiber-to-fiber and emitter-to-emitter/receiver-to-receiver beam patterns are highly accurate.

While the methods or process flows described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
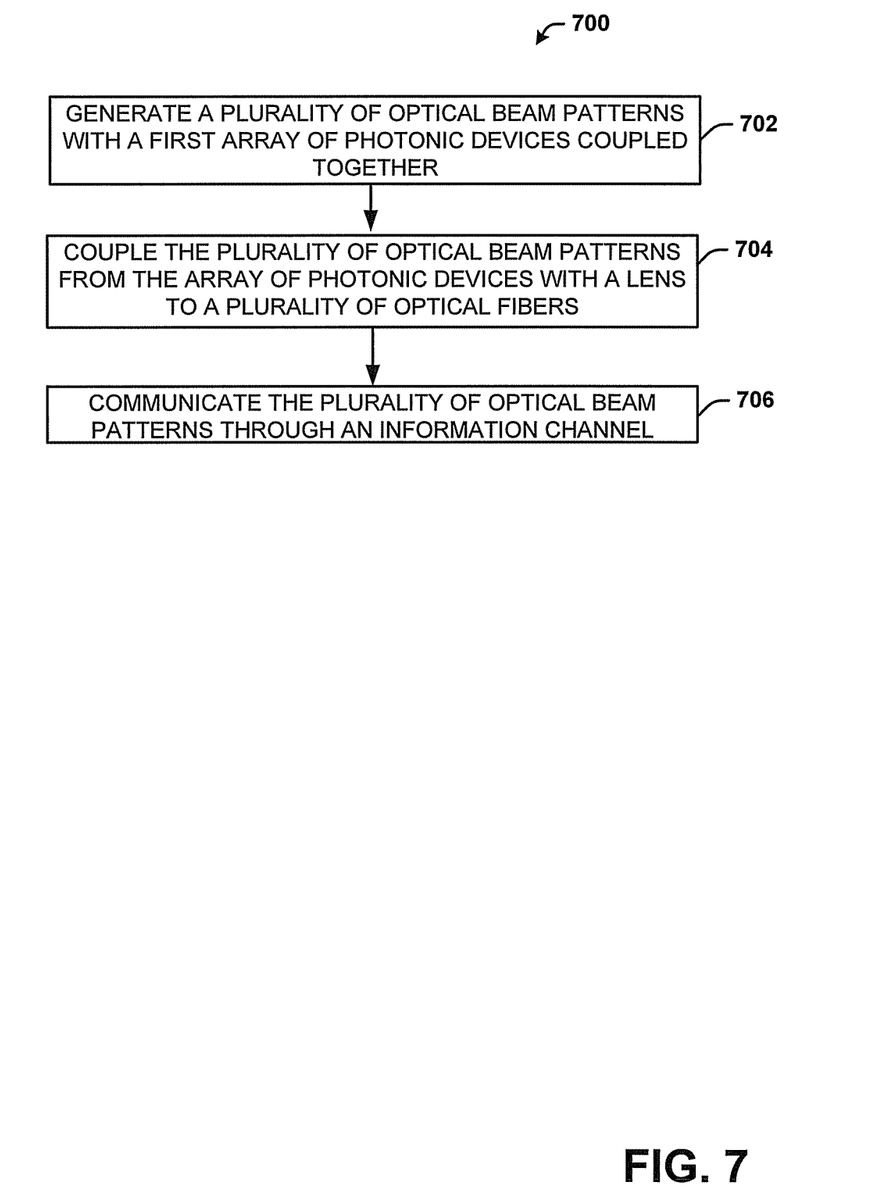
FIG. 7 illustrates an example flow diagram in accordance with various aspects described herein.

An example methodology 700 for implementing a method for an optic system having a collimated channel is illustrated in FIG. 7. Reference is made to the figures described above for ease of description. However, the method 700 is not limited to any particular embodiment or example provided within this disclosure.

FIG. 7 illustrates the exemplary method 700 for optically communicating an optical beam in a system in accordance with aspects described herein. The method 700, for example, provides for an optical system that operates to generate a very small spot size on a detector or receiver component in a signal transmission scheme.

At 702, the method begins with generating optical beam patterns, such as from an emitter or optical transmitter devices (e.g., VCSEL devices or the like). Optical beam patterns can be meant to be one or more optical beams that diverge outward over distance along a carrier wave as discussed herein. The array of photonic devices can include optical transceivers that transmit and receive data in an optical format, and/or transmitter devices. Alternatively, the array of photonic devices can include receiver devices having photodetector devices that receive optical beams and generate sensed patterns of the optical beams for conversion from an optical format to another physical format (e.g., electronic and/or mechanical).

At 704, the plurality of optical beam patterns can be coupled from the array of photonic devices with a lens to a plurality of optical fibers. For example, optical beams are transmitter and/or received via a single lens from the array of photonic devices and coupled to an array of fiber optics. The array of photonic devise can be emitters and/or receiver devices that are coupled to fiber communication channels that are provided in an array of optical fibers. The photonic devices and/or the array of optical fibers can be configured in honeycomb configuration for example and coupled to one another via a single lens from one array to another array. At 706, the plurality of optical beam patterns can be communicated via an information channel, in which the array of optical fibers provides a guided pathway therein, for example.

Figure 8:
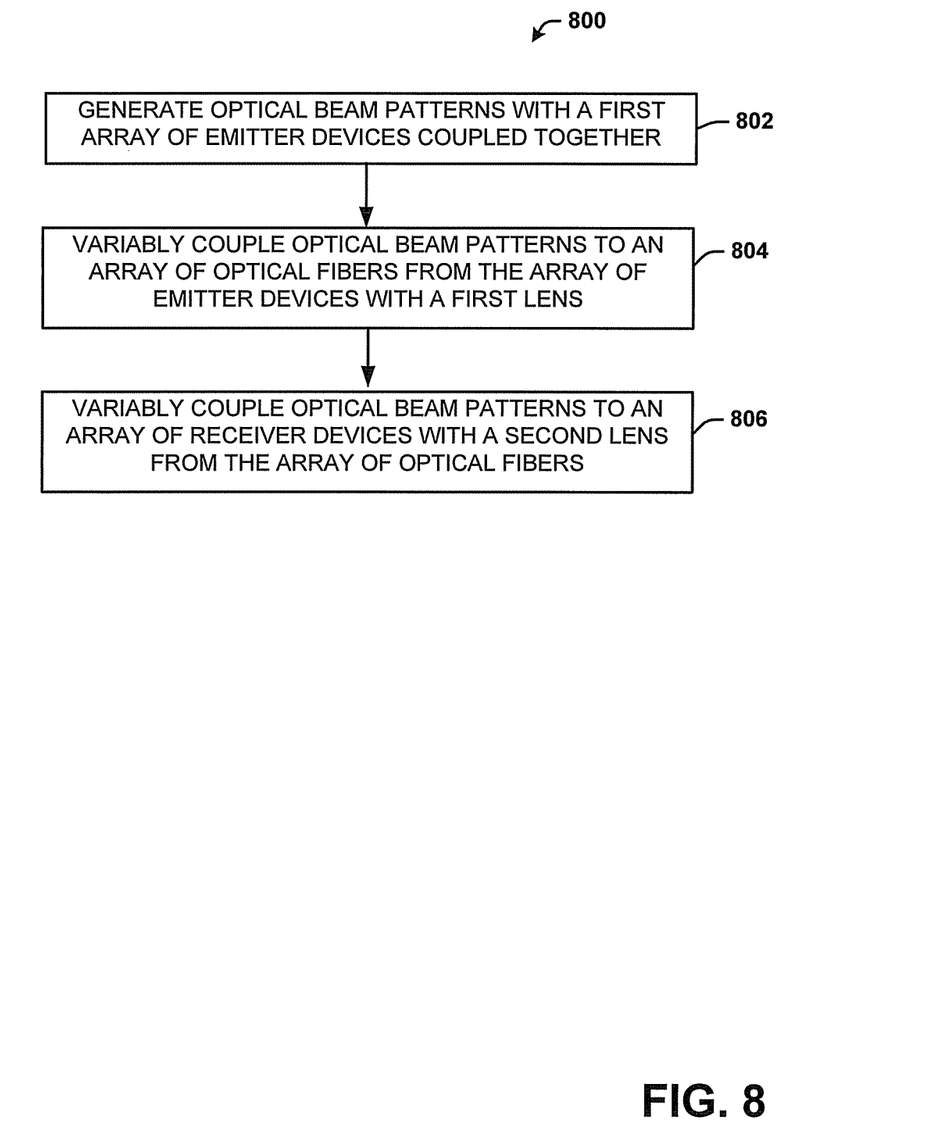
FIG. 8 illustrates another example of a flow diagram in accordance with various aspects described herein.

FIG. 8 illustrates another exemplary method 800 for optically communicating an optical beam (optical beam patterns) in a system in accordance with aspects described herein. The method 800, for example, includes transmitting at 802 an optical beam from an optical source that includes at least one array of transmitter devices (optical emitters) in a transmit channel to at least one array of optical fibers. A lens component operates to couple the optical beams emitted from the emitter devices to the array of fiber optics with a variable connection so that each emitter devices is not coupled by a fixed connection to a particular optical fibers. The lens component can be a first lens such as a convergent lens, a convex lens, or the similar lens. At 806, the optical beam patterns can be variably coupled to an array of receiver devices (e.g., photodiodes) from the array of optical fibers via a second lens component. The second lens component can include a similar, identical or different lens as the first lens component and operates to focus, direct and/or magnify the optical beams of one or more arrays of optical fibers in a single component to at least one array of receiver devices.

Exemplary Networked and Distributed Environments

One of ordinary skill in the art can appreciate that the various non-limiting embodiments of the shared systems and methods described herein can be implemented in connection with any computer or other client or server device, which can be deployed as part of a computer network or in a distributed computing environment, and can be connected to any kind of data store. In this regard, the various non-limiting embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the shared shopping mechanisms as described for various non-limiting embodiments of the subject disclosure.

Figure 9:
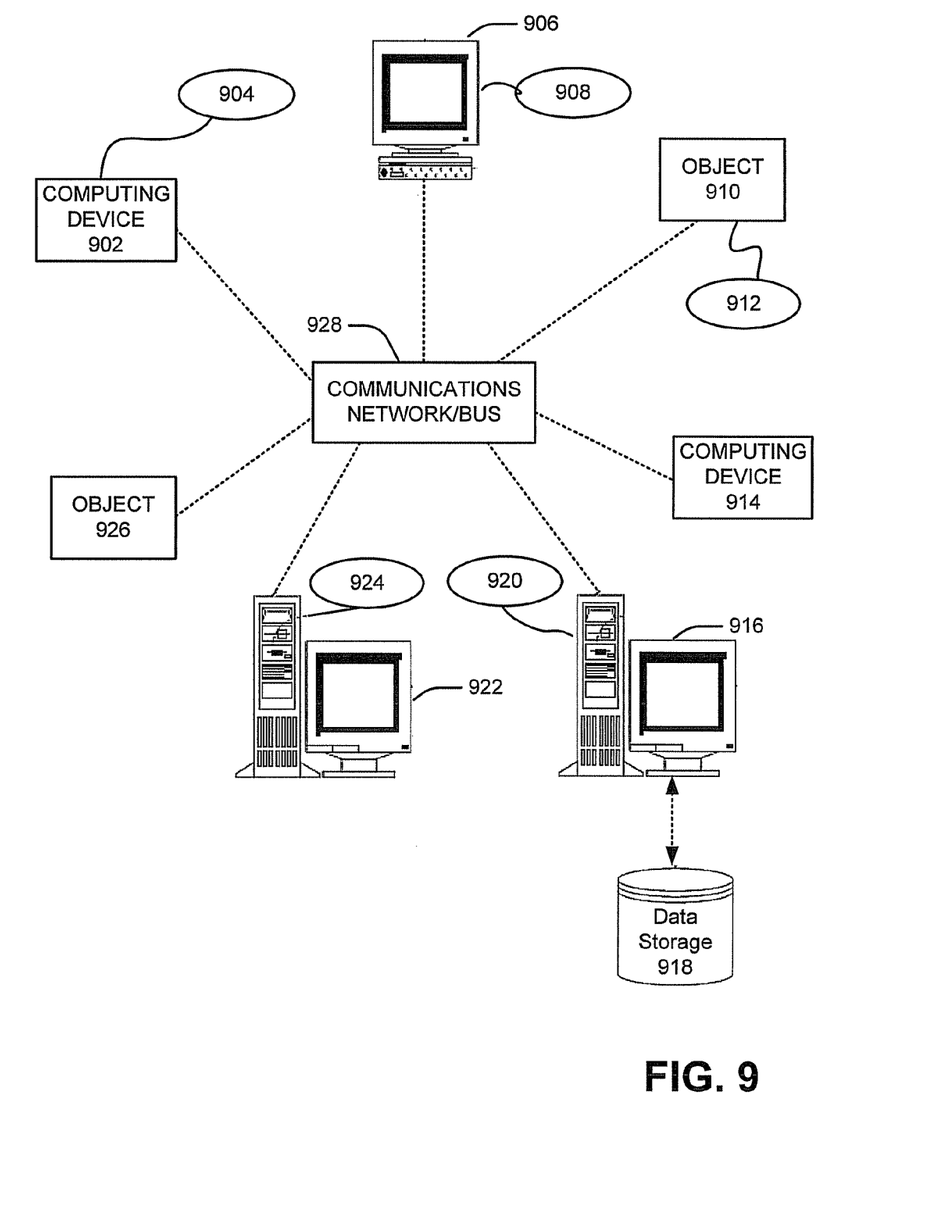
FIG. 9 is a block diagram representing exemplary non-limiting networked environments in which various non-limiting embodiments described herein can be implemented.

FIG. 9 provides a schematic diagram of an exemplary networked or distributed computing environment. The distributed computing environment comprises computing objects 910, 926, etc. and computing objects or devices 902, 906, 910, 914, etc., which may include programs, methods, data stores, programmable logic, etc., as represented by applications 904, 908, 912, 920, 924. It can be appreciated that computing objects 912, 926, etc. and computing objects or devices 902, 906, 910, 914, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, etc. can communicate with one or more other computing objects 910, 912, etc. and computing objects or devices 920, 922, 924, 926, etc. by way of the communications network 928, either directly or indirectly. Even though illustrated as a single element in FIG. 9, communications network 928 may comprise other computing objects and computing devices that provide services to the system of FIG. 9, and/or may represent multiple interconnected networks, which are not shown. Each computing object 910, 926, etc. or computing object or device 920, 922, 924, 926, etc. can also contain an application, such as applications 904, 908, 912, 920, 924, that might make use of an API, or other object, software, firmware and/or hardware, suitable for communication with or implementation of the shared shopping systems provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 9, as a non-limiting example, computing objects or devices 920, 922, 924, 926, etc. can be thought of as clients and computing objects 910, 926, etc. can be thought of as servers where computing objects 910, 926, etc., acting as servers provide data services, such as receiving data from client computing objects or devices 920, 922, 924, 926, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting services or tasks that may implicate the shared shopping techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 940 or bus is the Internet, for example, the computing objects 910, 926, etc. can be Web servers with which other computing objects or devices 920, 922, 924, 926, etc. communicate via any of a number of known protocols, such as the hypertext transfer protocol (HTTP). Computing objects 910, 912, etc. acting as servers may also serve as clients, e.g., computing objects or devices 920, 922, 924, 926, etc., as may be characteristic of a distributed computing environment.

Exemplary Computing Device

As mentioned, advantageously, the techniques described herein can be applied to a number of various devices for employing the techniques and methods described herein. It is to be understood, therefore, that handheld, portable and other computing devices and computing objects of all kinds are contemplated for use in connection with the various non-limiting embodiments, i.e., anywhere that a device may wish to engage on behalf of a user or set of users. Accordingly, the below general purpose remote computer described below in FIG. 10 is but one example of a computing device.

Although not required, non-limiting embodiments can partly be implemented via an operating system, for use by a developer of services for a device or object, and/or included within application software that operates to perform one or more functional aspects of the various non-limiting embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
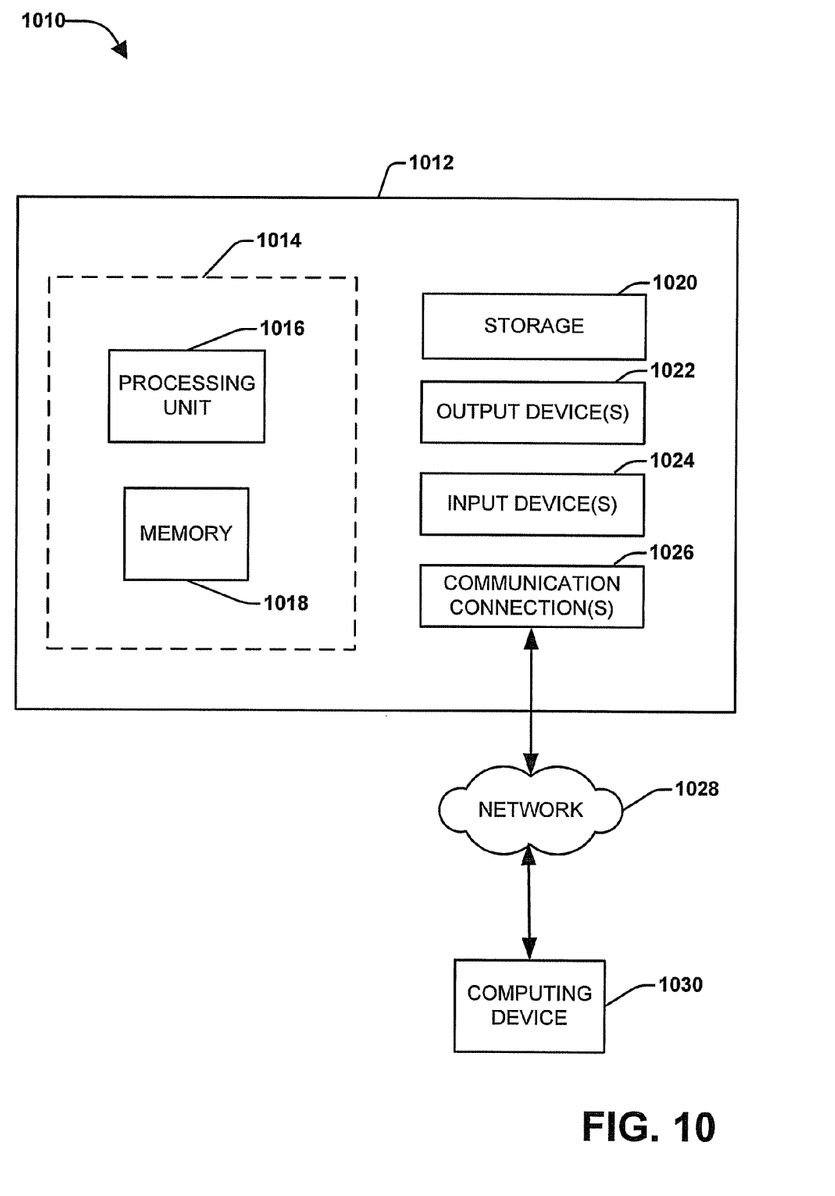
FIG. 10 is a block diagram representing an exemplary non-limiting computing system or operating environment in which one or more aspects of various non-limiting embodiments described herein can be implemented.

FIG. 10 and the following discussion provide a brief, general description of a suitable computing environment to implement embodiments of one or more of the provisions set forth herein. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" as used herein includes computer readable storage media and communication media. Computer readable storage media includes volatile and nonvolatile, removable and non-removable media implemented in any method or technology for storage of information such as computer readable instructions or other data. Memory 1018 and storage 1020 are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer readable storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may also include communication media. Communication media typically embodies computer readable instructions or other data that may be communicated in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An optical system, comprising:
   an information channel component configured for carrying an optical beam along a guided pathway and comprising a plurality of fiber optic channels bundled together;
   an optical transmitter component comprising a plurality of optical emitters coupled together in a first array, the plurality of optical emitters coupled to the information channel component; and
   a first lens component configured for coupling the optical beam from the plurality of optical emitters to the plurality of fiber optic channels for transmission of the optical beam, wherein the first lens component is the only lens of the optical system that is configured for coupling the optical beam to the plurality of fiber optic channels, and wherein individual optical emitters in the plurality of optical emitters are not coupled to individual fibers in the plurality of fiber optic channels such that there is a many-to-many correspondence between the plurality of optical emitters and the plurality of fiber optic channels and not a one-to-many, many-to-one, or one-to-one correspondence for at least a subset of the plurality of optical emitters and plurality of fiber optic channels.

2. The system of claim 1, wherein the first lens component comprises a first converging lens configured for focusing the optical beam from the plurality of optical emitters to the plurality of fiber optic channels and coupling the plurality of optical emitters to the information channel component.

3. The system of claim 2, wherein the plurality of fiber optic channels comprises optical fibers fused together in a honeycomb configuration, and the plurality of optical emitters are coupled together in the honeycomb configuration.

4. The system of claim 1, wherein the plurality of emitters comprise vertical-cavity surface-emitting lasers that are coupled together in the first array.

5. The system of claim 1 further comprising:
   a semiconductor die configured to integrate the optical transmitter component with the information channel component and the lens component via a substrate.

6. The system of claim 1 further comprising:
   an optical receiver component configured for receiving the optical beam via the information guide, and comprising a plurality of receiver devices coupled together in a second array.

7. The system of claim 6, wherein the first array comprises a different number of optical emitters than a number of receiver devices of the second array.

8. The system of claim 6 further comprising:
   a second lens component that comprises a second converging lens that is configured for focusing the optical beam from the information channel component to the plurality of receiver devise and coupling the plurality of fiber optic channels to the plurality of receiver devices.

9. The system of claim 6, wherein the plurality of receiver devices comprises a photodiode configured to convert the optical beam into an electrical signal.

10. The system of claim 1, wherein the first lens component is configured for generating a variable optical connection that variably couples at least one optical emitter of the plurality of optical emitters among fiber optic channels of the plurality of fiber optic channels.

11. A system, comprising:
    an array of photonic devices coupled together and configured for integrating at least one optical beam with an electronic circuit;
    an information channel component configured for guiding the optical beam along a guided pathway having a receive channel and a transmit channel, and comprising a plurality of optical fibers bundled together; and a lens component configured to couple the array of photonic devices to the information channel, and wherein there is no one-to-one correspondence between individual photonic devices in the array of photonic devices and the individual fibers in the plurality of optical fibers.

12. The system of claim 11, wherein the array of photonic devices comprises a plurality of emitters coupled together, a plurality of receiver devices coupled together, or the plurality of emitters and the plurality of emitters.

13. The system of claim 11, wherein the lens component comprises a convergent lens configured for coupling the array of photonic devices to the plurality of optical fibers of the information channel.

14. The system of claim 11, wherein the lens component is configured for generating a variable connection between the array of photonic devices and the plurality of optical fibers independently of individual alignments with optical fibers of the plurality of optical fibers.

15. The system of claim 11, wherein photonic devices of the array of photonic devices and the plurality of optical fibers are respectively configured in a honeycomb configuration having a hexagonal compact alignment at about sixty degrees with respect to one another.

16. The system of claim 11, wherein the lens component is configured for variably connecting at least one photonic device of the plurality of photonic devices among optical fibers of the plurality of optical fibers based on an arrangement of the plurality of photonic devices to the plurality of optical fibers.

17. The system of claim 11, wherein optical fibers of the plurality of optical fibers are fused together to form the information channel.

18. The system of claim 11, wherein the receive channel and the transmit channel of the information guide comprise equal distances from at least one photonic device to an end surface of the information guide respectively.

19. A method for optical coupling in an optical system, comprising:

generating a plurality of optical beam patterns with a first array of photonic devices coupled together;

coupling the plurality of optical beams patterns from the array of photonic devices with a single lens to a plurality of optical fibers bundled together in an information channel, such that the array of photonic devices is variably connected to the plurality of optical fibers and where no single emitter is associated with a particular optical fiber; and communicating the plurality of optical beam patterns through the information channel.

20. The method of claim 19, further comprising:

coupling the information channel with a different lens to a second array of photonic devices, wherein the first array of photonic devices include an optical emitter devices and the second array of photonic devices include optical receiver devices.

* * * * *